(12) United States Patent
Wollenweber

(10) Patent No.: US 9,336,614 B1
(45) Date of Patent: May 10, 2016

(54) METHODS AND SYSTEMS FOR PERFORMING JOINT ESTIMATION TECHNIQUES IN IMAGE RECONSTRUCTION

(71) Applicant: General Electric Company, Schenectady, NY (US)

(72) Inventor: Scott David Wollenweber, Waukesha, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/663,756

(22) Filed: Mar. 20, 2015

(51) Int. Cl.
*G06K 9/00* (2006.01)
*G06T 11/00* (2006.01)
*G06T 7/00* (2006.01)

(52) U.S. Cl.
CPC ............. *G06T 11/008* (2013.01); *G06T 7/0085* (2013.01); *G06T 2207/10004* (2013.01); *G06T 2207/10081* (2013.01); *G06T 2207/10104* (2013.01); *G06T 2207/10108* (2013.01); *G06T 2207/30061* (2013.01)

(58) Field of Classification Search
USPC .................................................. 382/128–134
See application file for complete search history.

(56) References Cited

U.S. PATENT DOCUMENTS

| | | | | |
|---|---|---|---|---|
| 6,693,962 | B1 * | 2/2004 | Murching | G06T 7/0081 375/240.08 |
| 2013/0137549 | A1 * | 5/2013 | Hamada | A63B 24/0087 482/4 |
| 2013/0177235 | A1 * | 7/2013 | Meier | G06T 15/00 382/154 |
| 2013/0218238 | A1 * | 8/2013 | Yokoi | A61B 5/0482 607/62 |
| 2013/0248719 | A1 * | 9/2013 | Volokh | A61B 6/037 250/362 |
| 2015/0269744 | A1 * | 9/2015 | Mukherjee | G06T 7/208 382/103 |
| 2015/0317796 | A1 * | 11/2015 | Schett | A61B 6/037 424/134.1 |

FOREIGN PATENT DOCUMENTS

WO    2014176154 A1    10/2014

OTHER PUBLICATIONS

"Simultaneous maximum a—posteriori reconstruction of attenuation and activity distributions from emission sinograms," Nuyts et al, IEEE Trans Med Imaging, 1999; 18 (5): 393-403.
"Joint estimation of respiratory motion and PET image in 4D PET reconstruction with modeling attenuation map deformation induced by respiratory motion," Chen et al, J Nucl Med. 2010; 51 (Supplement 2):523.
"Joint estimation of respiratory motion and activity in 4D PET using CT side information," Jacobson et al., Biomedical Imaging: Nano to Macro, 2006. 3rd IEEE International Symposium.
Defrise M, Rezaei A, Nuyts J. Time-of-flight PET data determine the attenuation sinogram up to a constant. Phys Med Biol. 2012;57:885-899.
Rezaei A, Defrise M, Bal G, Michel C, Conti M, Watson C, Nuyts J. Simultaneous reconstruction of activity and attenuation in time-of-flight PET. IEEE Trans Med Imag. 2012;31:2224-2233.
Rezaei A, Defrise M, Nuyts J. ML-reconstruction for TOF-PET with simultaneous estimation of the attenuation factors. IEEE Trans Med Imaging. 2014;33:1563-1572.

* cited by examiner

*Primary Examiner* — Alex Liew
(74) *Attorney, Agent, or Firm* — Lucas Divine

(57) ABSTRACT

A method for correcting an emission tomography image includes obtaining a first modality image dataset, identifying areas in the first modality dataset that may be impacted by respiratory motion, and applying joint estimation attenuation correction techniques to improve emission image data. A medical imaging system is also described herein. Emission tomography may include positron emission tomography (PET) and single photon emission computed tomography (SPECT).

25 Claims, 6 Drawing Sheets

METHODS AND SYSTEMS FOR PERFORMING JOINT ESTIMATION TECHNIQUES IN IMAGE RECONSTRUCTION

BACKGROUND OF THE INVENTION

The subject matter disclosed herein relates generally to imaging systems, and more particularly to a method and system for performing correction and reconstruction of medical images.

Multi-modality imaging systems scan using different modalities, for example, Computed Tomography (CT), Magnetic Resonance Imaging (MRI), Positron Emission Tomography (PET), and Single Photon Emission Computed Tomography (SPECT). During operation, image quality may be affected by various factors. One such factor is patient motion. Another factor is inaccurate attenuation correction between images acquired using two different imaging modalities caused by the patient motion.

Accordingly, at least one known PET-CT system utilizes data that is generated by the CT system to generate an attenuation correction of the PET scan data. Specifically, a plurality of emission attenuation correction factors are derived from CT data that is generated during a CT scan, wherein the CT system is specifically configured to generate data to be utilized for the CT attenuation correction factors. More specifically, the CT information is utilized to generate an attenuation map, which may then be applied to attenuation correct PET or SPECT emission information.

In PET imaging, for example, an accurate quantitative reconstruction of the tracer distribution requires taking into account the attenuation and scatter of the photons by the tissues. Scatter correction requires accurate attenuation estimation. Respiratory motion can have a negative effect on the accuracy of a generated attenuation map. Certain respiratory affected areas of a scanned subject may be susceptible to an attenuation correction mismatch between the CT attenuation correction factors and the PET emission information. Reducing this mismatch with improved technologies is needed to improve accuracy and image quality.

BRIEF DESCRIPTION OF THE INVENTION

In accordance with an embodiment, an imaging system and method is provided, comprising: acquiring a computed tomography (CT) dataset; determining lung border information from the CT dataset; generating a border mask by generating an image mask for voxels within the lung border information and voxels within a parameterized distance of the lung border; acquiring an emission tomography dataset; and reconstructing the emission tomography dataset; wherein the reconstructing the emission tomography dataset includes applying the border mask to the emission tomography dataset, reconstructing emission voxels inside the border mask with joint attenuation-activity estimation techniques, reconstructing emission voxels outside the border mask with activity estimation techniques, and combining reconstructed image voxels into a reconstructed emission tomography image. The system may include a CT system, a PET system, and/or a SPECT system. The system and method can further comprise outputting the reconstructed emission tomography image to a network, display, printer, or memory device. The parameterized distance can be set based on imaging history, a patient characteristic, or an operator input.

Further, in accordance with an embodiment, joint attenuation-activity estimation techniques comprise alternating updates of an image voxel between activity reconstruction and attenuation reconstruction. The joint attenuation-activity estimation techniques converge towards a local optimum. The activity reconstruction includes activity information from the emission tomography dataset and the attenuation reconstruction includes attenuation information from the CT dataset. Activity estimation attenuation correction techniques comprise using an attenuation map generated from the CT data set.

Further, in accordance with an embodiment, the emission tomography dataset is a positron emission tomography (PET) dataset. In accordance with an embodiment, the emission tomography dataset is a single photon emission computed tomography (SPECT) dataset.

Further, in accordance with an embodiment, the emission tomography dataset is four dimensional (4D) and the steps of determining lung border information, generating a border mask, and reconstructing the emission tomography dataset are performed for each bin of the emission tomography dataset. The system and method can further generate 4D reconstructed emission images by combining the reconstructed emission tomography datasets for each bin.

Further, in accordance with an embodiment, an MRI imaging system and MRI image datasets are used instead of CT.

DETAILED DESCRIPTION OF THE INVENTION

Figure 1:
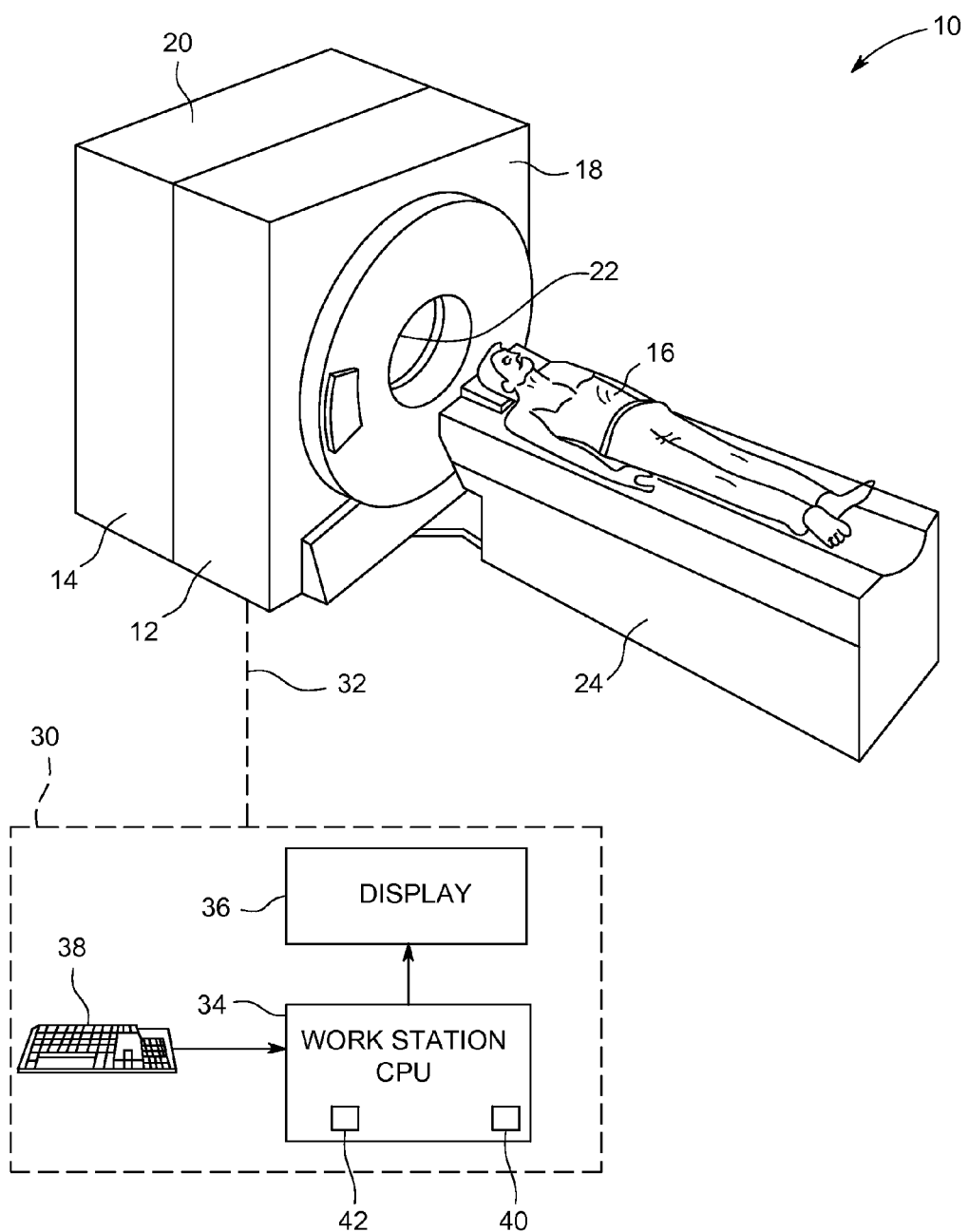
FIG. 1 is a pictorial view of an exemplary imaging system formed in accordance with various embodiments.

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments in which data representing an image is generated, but a viewable image is not. Therefore, as used herein the term "image" broadly refers to both viewable images and data representing a viewable image. However, many embodiments generate, or are configured to generate, at least one viewable image.

FIG. 1 is a pictorial view of an exemplary imaging system formed in accordance with various embodiments. The imaging system 10 is a multi-modality imaging system that includes different types of imaging modalities, such as Positron Emission Tomography (PET), Single Photon Emission Computed Tomography (SPECT), Computed Tomography (CT), ultrasound, Magnetic Resonance Imaging (MRI) or any other system capable of generating diagnostic images. In the illustrated embodiment, the imaging system 10 is a PET/CT system. The various embodiments are not limited to medical imaging systems for imaging human subjects, but may include veterinary or non-medical systems for imaging non-human objects.

Referring to FIG. 1, the multi-modality imaging system 10 includes a first modality unit 12 and a second modality unit 14. These units may be aligned along an axis, as shown in 10, or may co-habit a common space surrounding the patient such as having second modality unit 14 inside first modality unit 12 or vice versa. The two modality units enable the multi-modality imaging system 10 to scan an object or subject 16 in a first modality using the first modality unit 12 and to scan the subject 16 in a second modality using the second modality unit 14. The scans may optionally, in the co-habited modality case, be simultaneous. The multi-modality imaging system 10 allows for multiple scans in different modalities to facilitate an increased diagnostic capability over single modality systems. In the illustrated embodiment, the first modality unit 12 is a PET imaging system and the second modality unit 14 is a CT system. The imaging system 10 is shown as including a gantry 18 that is associated with the PET imaging system 12 and a gantry 20 that is associated with the CT system 14. During operation, subject 16 is positioned within a bore, or central opening, 22, defined through imaging system 10, using, for example, a motorized table 24.

The imaging system 10 also includes an operator workstation 30. During operation, motorized table 24 moves subject 16 into central opening 22 of gantry 18 and/or gantry 20 in response to one or more commands received from operator workstation 30. Workstation 30 then sends signals to the first and/or second modality units 12 and 14 to both scan subject 16 and acquire emission data and/or CT data of subject 16. Workstation 30 may be embodied as a computer that is positioned near imaging system 10 and hard-wired to the imaging system 10 via a communication link 32. Workstation 30 may also be embodied as a portable computer such as a laptop computer or a hand-held computer that transmits information to, and receives information from imaging system 10. Optionally, the communication link 32 may be a wireless communication link that enables information to be transmitted to and/or from the workstation 30 to the imaging system 10 wirelessly. In operation, workstation 30 is configured to control the operation of the imaging system 10 in real-time. Workstation 30 is also programmed to perform medical image diagnostic acquisition and reconstruction processes described herein.

Workstation 30 includes a central processing unit (CPU) or computer 34, a display 36, and an input device 38. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer". In the exemplary embodiment, computer 34 executes a set of instructions that are stored in one or more storage elements or memory devices 42, in order to process information received from the first and second modalities 12 and 14. The storage elements may also store data or other information as desired or needed. The storage element may be in the form of an information source or a physical memory element located within the computer 34.

The imaging system 10 also includes an attenuation correction module 40 that implements various methods described herein. Attenuation correction module 40 may be implemented as a piece of hardware that is installed in the computer 34. Optionally, the attenuation correction module 40 may be implemented as a set of instructions that are installed on the computer 34. The set of instructions may be stand-alone programs, may be incorporated as subroutines in an operating system installed on the computer 34, may be functions in an installed software package on the computer 34, and the like. It should be understood that the various embodiments are not limited to the arrangements and instrumentality shown in the drawings.

The set of instructions may include various commands that instruct the computer 34 as a processing machine to perform specific operations such as the methods and processes of the various embodiments described herein. The set of instructions may be in the form of a software program. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 2:
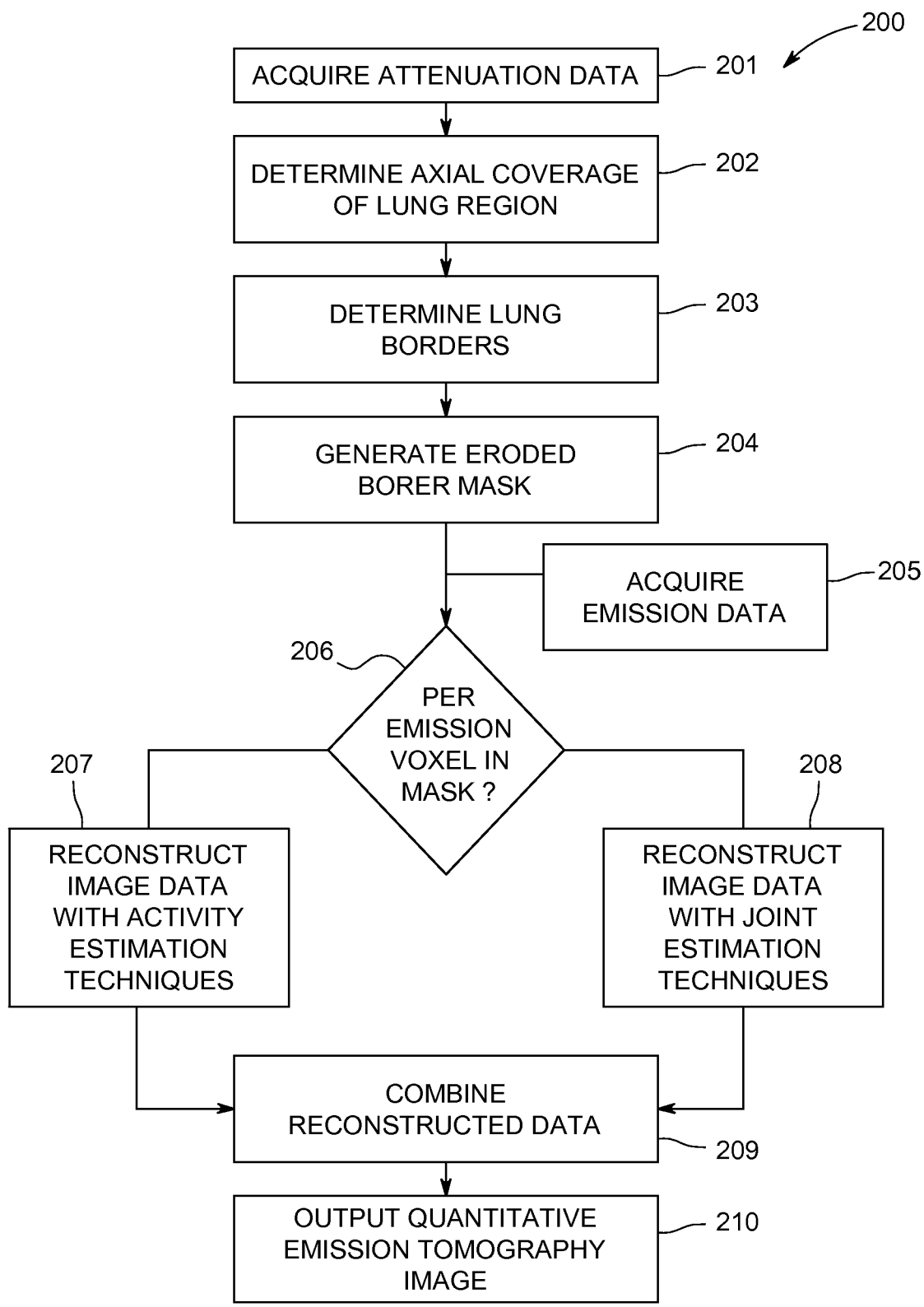
FIG. 2 is a flowchart illustrating a method for attenuation correcting emission data in accordance with various embodiments.

FIG. 2 is a flowchart illustrating a method for attenuation correcting emission data in accordance with various embodiments. FIG. 2 is a flowchart of an exemplary method 200 for attenuation correcting emission data. PET emission data will be referred to as an exemplary embodiment. In various embodiments, method 200 may be implemented using, for example, the computer 34 and/or the attenuation correction module 40.

In step 201, attenuation data, also known as a CT dataset, is acquired using, for example, the CT system 14 shown in FIG. 1. The CT data may be obtained by performing a scan of subject 16. Optionally, the CT data may be obtained from data collected during a previous scan of the subject 16, wherein the CT data had been stored in a memory device, such as memory device 42. The CT data may be stored in any format. The CT dataset may be obtained during real-time scanning of the subject 16. It may be a whole-body scan or a scan for only a portion of the subject. The CT scan may target a region of interest (ROI). If the CT data acquisition is performed for only a portion of the subject, it is generally the same region of the subject as scanned by the additional modality in this multi-modality system.

In step 202, the system determines axial coverage of a lung region using the acquired CT data. The specific embodiment shown in FIG. 2 focuses on correcting image quality issues related to respiratory motion caused by usage of the lungs. Since the first modality (CT) produces data that is used for attenuation correction of the emission tomography data, any mis-match in patient respiratory state or mismatch due to the longer temporal nature of the emission dataset (with respect to the attenuation dataset) will contribute to loss of attenuation-corrected emission data image quality. Respiratory motion also impacts the quality of emission tomography scan data and the corresponding reconstructed image. The lung region is defined as an axial coverage that includes the lungs and expands out a distance outward from the lungs to also capture areas moderately to strongly affected by the respiratory motion. This can include from the upper lung to the lung-diaphragm border and could reach down to the bladder. See axial coverage 308 in FIG. 3, for example. The axial coverage may be adjusted by the system or a user based on preferences or inputs. The user may also choose to have the system expand the axial coverage to include a distance inferior to the lungs, which may also be impacted by attenuation artifacts at the skin and air boundary. Thus, the methods described herein can be applied to additional attenuation artifact situations where respiratory motion impacts the motion of air-tissue interfaces within the patient (both external and internal interfaces).

In step 203, the system determines the (3D) three-dimensional lung borders using the CT axial coverage image data from step 202. The determined lung borders can be a data subset of the full CT dataset, and a padding on the axial ends can be used to allow for axial extension. A 3D image gradient of the pixel values in the lung region may be calculated to find the targeted boundaries where the image gradient is greater than a preset value. This provides a definition of the border for areas most impacted by respiratory motion. The system or user can set such preset value. Other methods to detect lung borders could be used. As an alternative, the system can be set to target air, tissue, or bone areas. In those circumstances, this step would not focus on determining lung borders, but would focus on determining those alternate regions using techniques known in the art.

In an embodiment, step 203 focuses on lung borders. In an alternate embodiment, step 203 can focus on other areas of the body affected by respiratory movement. These are areas such as near the diaphragm or other areas near the lungs. For example, Melanoma cases, where a tumor can be on the skin of a patient, can have respiration-affected artifacts. This is especially true of the emission and attenuation scans mismatch. Thus, in these areas, the system can determine a body border in step 203 and then create the related eroded body border mask in step 204.

In step 204, the system generates an eroded border mask. Erosion means that the border is blurred, or slightly expanded to include more pixels in the neighborhood of the detected border. The system creates an image mask where the voxels in the mask are set to a value (1, for example) if the voxel is part of the determined lung border of step 203. The system then expands the mask, applying the 1 value to voxels within a parameterized, changeable, distance of the determined lung border pixels. Erosion is one technique to accomplish this. The parameterized value can be system generated based on a variety of factors, including history, patient characteristics (such as breathing cycle, breathing amplitude), and/or user settings. This parameterized value intends to capture additional nearby pixels to the air-tissue interface that are likely affected by respiratory motion (or other issues if the method is improving different attenuation artifact types). An eroded border mask expands the border mask to expand coverage in regions with a high spatial density change. The remaining voxels in the mask are set to an alternate value (0, for example). Thus, an eroded border mask of the air-tissue border is generated that includes the lung border and an eroded, or expanded, area from the lung border.

In step 205, a PET emission dataset, or sinograms, are acquired using, for example, the PET system 12 shown in FIG. 1. The PET emission dataset may be obtained by performing a scan of the subject 16. Optionally, the PET emission dataset may be obtained from data collected during a previous scan of the subject 16, wherein the PET emission dataset has been stored in a memory device, such as a memory device 42. The PET emission dataset may be stored in any format. The PET emission dataset may be obtained during real-time scanning of the subject 16. A raw PET emission dataset may be processed into emission image data.

In step 206, a decision is made for each voxel in the emission image data from step 205, whether that voxel is within the eroded border mask from step 204. Thus, the border mask is applied to the emission dataset. If a voxel is not within the mask, the system proceeds to step 207. If the voxel is within the mask, it is in an area where an attenuation map may not be estimated correctly due to mismatch caused by respiration motion, so the system proceeds to step 208. This localization of where to apply joint estimation techniques, in step 208, reduces the risk of inaccuracy in areas of no attenuation gradients. Since joint estimation techniques may take longer than activity estimation techniques, only applying joint estimation techniques where such techniques are needed keeps the system image reconstruction speed as low as possible while still producing as accurate an image estimate as possible.

In step 207, the system reconstructs the emission image data with activity estimation techniques. Activity estimation techniques include using pre-measured attenuation estimates. This includes generation and use of an attenuation map from the CT data and matching voxel by voxel to the emission data. These are voxels where a standard attenuation map created from the CT data is likely to be accurate because respiratory motion, for example, has less impact or does not mismatch attenuation coefficients in these areas. The pre-measured attenuation map is thus applied to the emission data during image reconstruction.

In step 208, the system reconstructs image data with joint estimation techniques, by alternating between estimation of the activity and attenuation, using the emission data and joint estimation. In specific, joint attenuation-activity estimation is used for these regions that have been determined to be near an attenuation gradient and thus likely to be respiration-affected. Joint estimation techniques include iterative algorithms that alternately estimate the tracer activity concentration distribution and the attenuation image using only the emission data. Joint estimation techniques iteratively alternate estimating the activity concentration in the reconstructed voxels by estimating attenuation information and activity data. The attenuation information may initially be estimated from the CT scan. The CT values are used along with a conversion to the required photon energy of 511 keV and forward projected to obtain an attenuation correction factor sinogram. This provides a spatial distribution of attenuation coefficients which can be applied to the measured emission data. Thus, joint estimation techniques include a successive optimization approach in which the emission, or activity, image is updated through image reconstruction alternating between using the attenuation image modeled using the emission image estimate and CT attenuation information. Phrased another way, joint attenuation-activity estimation repeatedly iterate the current attenuation and activity estimates needed to form an attenuation-corrected activity image, then compare against the measured emission data. By alternating updates of the image voxel between activity reconstruction and attenuation reconstruction, the voxel converges towards a consistent local optimum to provide a more accurate attenuation correction. This, in turn, provides a more accurate reconstruction of the emission data.

In step 209, the system combines the reconstructed emission data from steps 207 and 208 into a single reconstructed emission dataset.

In step 210, the system outputs, to a memory, display, network, or other location, the corrected, quantitative emission tomography image. These images may be represented in Bq/ml.

This method reduces errors in quantitation and image artifacts by improving the match between emission data and the static CT data while keeping image reconstruction time to a minimum. Thus, improved images can be output and displayed to users. One example of a user would be a medical professional.

In an alternate embodiment, the systems and methods herein may comprise a MRI system combined with an emission tomography system (PET/SPECT) since the MRI images can provide an initial estimate of an attenuation map. Thus, steps 201-204, and others, may be completed with MRI data generated by an MRI imaging system.

Figure 3:
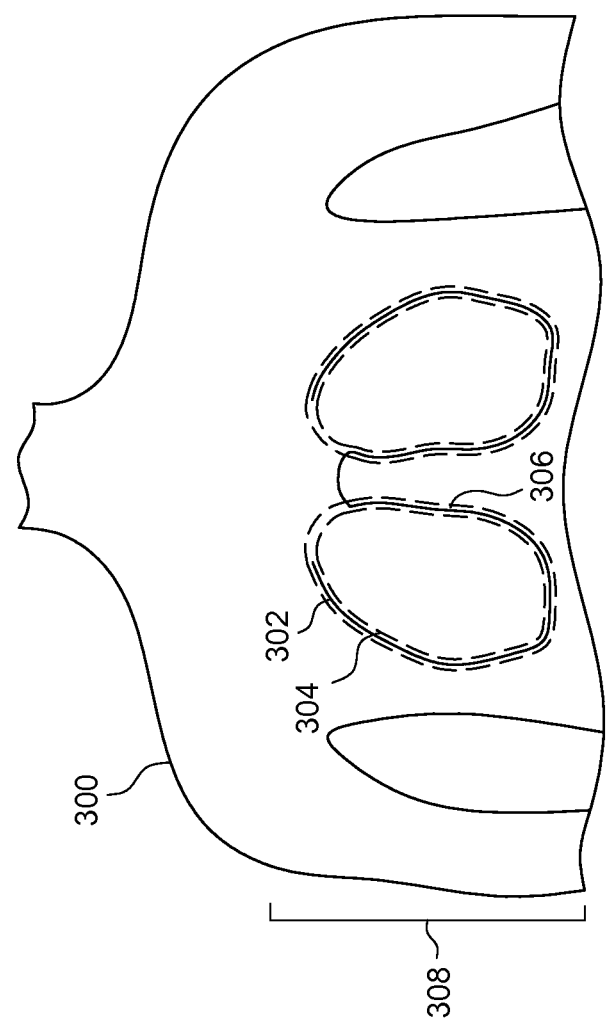
FIG. 3 is an exemplary image illustrating eroded borders in accordance with various embodiments.

FIG. 3 is an exemplary image illustrating eroded borders in accordance with various embodiments. FIG. 3 helps to visualize the steps of the method 200 in accordance with the specific respiratory embodiment. Other usages of method 200 are discussed throughout. A patient portion 300 is shown. Axial coverage 308 is a range of a lung region is determined in step 202. Lung borders 302 are determined in step 203. Eroded borders 304 (dotted lines) are used in step 204 to generate an eroded border mask. Parameterized value 306 is used to determine the 3D eroded borders 304 around the 3D lung borders 302, by providing a distance from lung borders 302 that should be included in the eroded borders. Parameterized value 306 is shown as the distance between the eroded border 304 and the lung border 302. FIG. 3 shows parameterized value 306 as being consistent around the border. In an alternate implementation, certain areas may have varying parameterized values that apply to regions that may be affected by respiratory motion more than others.

Figure 4:
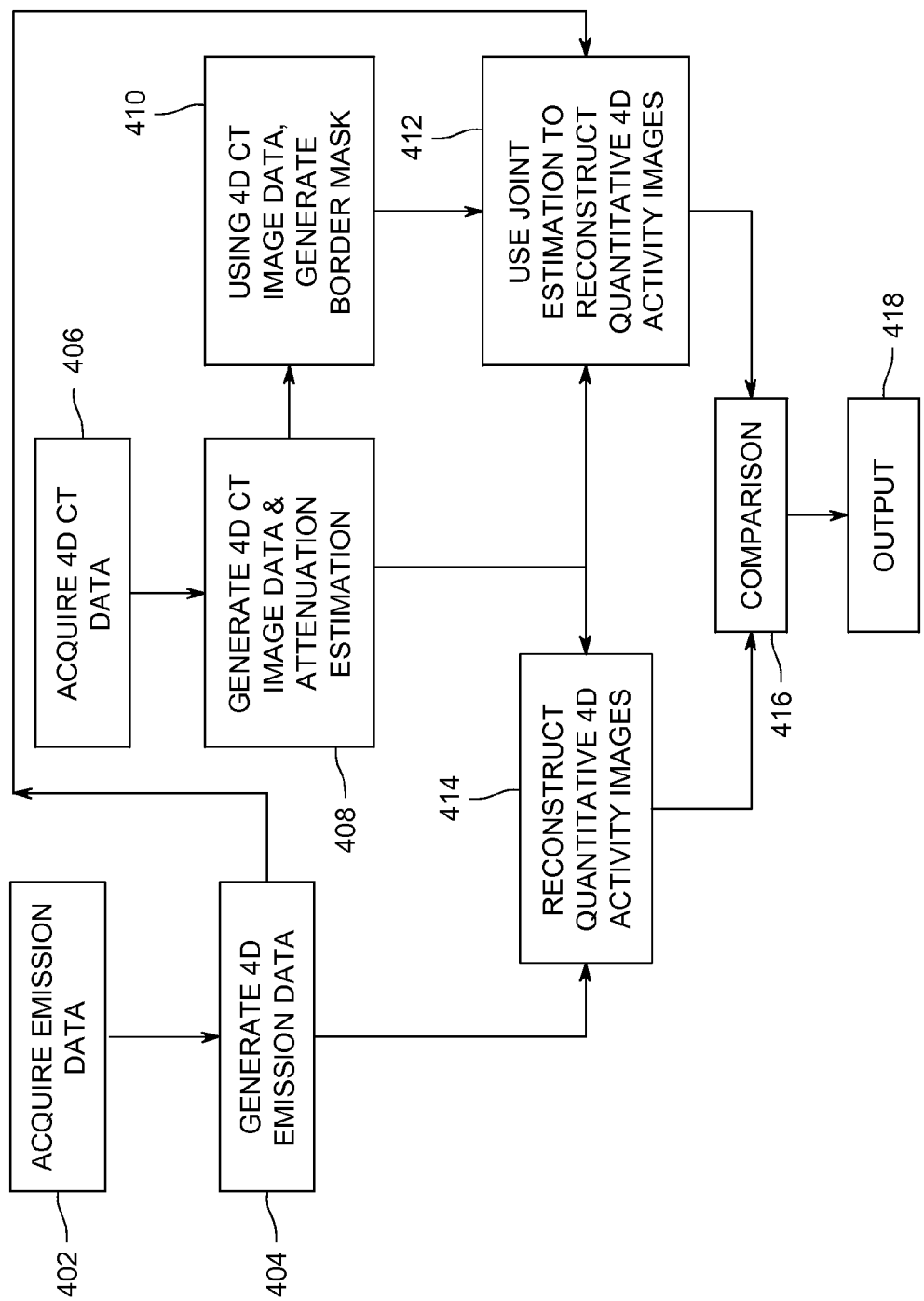
FIG. 4 is a flowchart illustrating a method for attenuation correcting 4D emission data in accordance with various embodiments

FIG. 4 is a flowchart illustrating a method for attenuation correcting 4D (four-dimensional, i.e. including time information) emission data in accordance with various embodiments. An issue can arise due to the time difference in acquiring two sets of image data that are to be motion-matched. 4D CT acquisition can be performed over a single respiration cycle. Alternatively, MRI data is used instead of CT. MRI data can be acquired either simultaneously or in progression with emission data over one or more respiratory cycles. Gated, or binned, emission data collection typically utilizes several, can be twenty or more, cycles per data volume. Mismatch in breathing pattern can occur, both due to the image acquisition time difference as well as due to variability inherent in the subject's breathing pattern. This method seeks to improve image reconstruction by reducing errors related to this mismatch by allowing the joint estimation of attenuation and emission in areas near an air/tissue interface.

In step 402, the system acquires emission data related to a subject of an image scan. This is described further in relation to FIG. 5 with reference to PET emission data. In an alternative embodiment, SPECT data may be acquired.

In step 404, the system generates 4D emission data from the acquired emission data. The system adds in the fourth-dimension by binning the data over respiratory cycles. There can be six respiratory cycle bins, according to an embodiment. This could happen alternately or simultaneously with the CT data acquisition depending on the specific hardware embodiment utilized.

In step 406, the system acquires 4D CT data related to a subject of an image scan. The system may perform a whole-body scan or a scan for only a portion of the subject. The CT scan may target a region of interest (ROI). If the CT data acquisition is performed for only a portion of the subject, it is generally the same region of the subject as will be scanned by the additional modality in this multi-modality system. This is described further in relation to FIG. 6. In an alternative embodiment, MRI data may be acquired.

In step 408, the system generates 4D CT images and an attenuation estimation from the 4D CT data. The attenuation estimation may be in the form of an attenuation map, in an embodiment.

In step 410, the system uses 4D CT image data generated in step 408 to generate a border mask. An eroded border mask can be generated for CT data within each bin. This step may utilize steps 202, 203, and 204 of FIG. 2.

In step 412, the system performs quantitative reconstruction to generate 4D activity images using joint estimation techniques. This can be completed for each bin of the selected image type. The system generates 4D activity images that have utilized joint attenuation-activity estimation in the reconstruction thereof. For each bin, the system can compare the emission voxels with the respective eroded border mask in order to determine if the specific voxel should be reconstructed with activity estimation techniques or joint attenuation-activity estimation techniques, as discussed with respect to steps 206, 207, 208, and 209 of FIG. 2. These images can be stored in a memory device, output over a computer network, printed on paper, and/or be displayed on an operator console. In step 412, the system may apply additional types of quantitative corrections for CT/emission images.

In step 414, the system reconstructs 4D activity images from the 4D emission data of step 404 and the CT image data and attenuation estimation of step 408. This may be performed for each bin, or gate, of the selected image type. As the 4D CT and emission images include time information, the image may be binned with portions of the image data placed into select bins for reconstruction based on its relation to the time information. In a respiratory image, there may be six bins, for example, that capture six states of the respiratory cycle. This step also includes image reconstruction techniques; including utilizing attenuation correction in the reconstruction of the bin matched 4D images using the attenuation estimation of step 408. The system produces initial 4D images across the full respiratory cycle. These initial 4D images can be stored in a memory device, output over a computer network, printed on paper, and/or be displayed on an operator console.

In step 416, the system performs a comparison or calculation of the 4D activity image volumes that have utilized joint estimation techniques from step 412 and the initial 4D image volumes from step 414. The comparison shows how well of a position, or phase, match was completed in the 4D image volume between the CT and emission data. The comparison could be done by calculating a Jaccard distance for the two image volumes. The higher the Jaccard distance, the more divergent the image sets. Alternate methods to determine image similarities may be used. A third image data set highlighting the detected differences can also be generated, stored, and output.

In step 418, the results of the comparison, as well as each set of 4D images can be output, either to a computer, display screen, computer network, memory device, or other location. The output to a user can provide side by side comparisons, varying colors, shapes, angles, and/or words to clearly communicate the differences between the image sets. This additional comparison information may help a medical professional make an informed judgment related to the subject being scanned. In addition, for a feature or region of diagnostic interest, the system can output a quantitative comparison as a function of each bin for each 4D reconstruction approach to forming the activity image volume. Reconstruction methods that produce the most consistent feature quantitation across bins may be considered as more accurate under the assumption that features don't stretch or change shape and that the bins represent 'snapshots' of the actual tracer uptake value during that bin.

Described herein are methods and systems that utilize CT information to provide attenuation correction of emission images. Imaging systems can suffer from respiration-induced mismatch between the emission data and the attenuation correction data when the two are not acquired simultaneously, as is done routinely in PET/CT. These methods seek to reduce the impact of a mismatch and create improved images. The system can perform complete joint estimation techniques to the entire volume of the activity images, but this may take a longer time than preferred. Thus, the system can make intelligent decisions to provide both prompt and accurate images.

Various embodiments of the methods described herein may be provided as part of, or used with, a medical imaging system, such as a dual-modality imaging system 10 as shown in FIG. 1.

Figure 5:
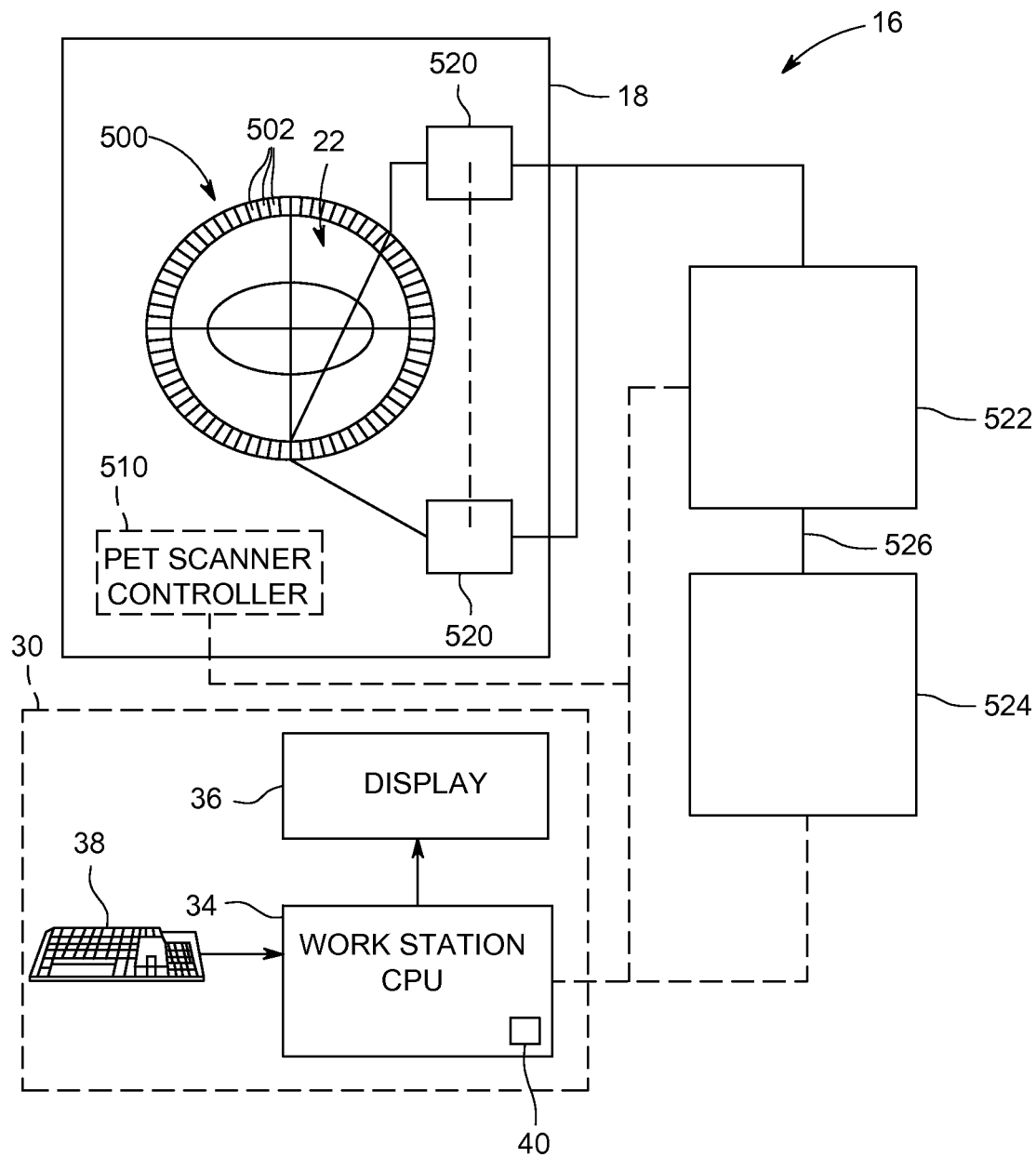
FIG. 5 is a block schematic diagram of a first modality unit shown in FIG. 1 in accordance with various embodiments.

FIG. 5 is a block schematic diagram of the first modality unit 12, e.g. the PET imaging system, shown in FIG. 1. PET system 12 includes a detector array 500 that is arranged as ring assembly of individual detector modules 502. The detector array 500 also includes the central opening 22, in which an object or patient, such as the subject 16 may be positioned, using, for example, the motorized table 24 (shown in FIG. 1). The motorized table 24 is aligned with the central axis of detector array 500. During operation, motorized table 24 moves the subject 16 into central opening 22 of detector array 500 in response to one or more commands received from operator workstation 30. More specifically, a PET scanner controller 510 responds to the commands received from operator workstation 30 through communication link 32. Therefore, the scanning operation is controlled from operator workstation 30 through PET scanner controller 510.

During operation, photons are emitted when positrons, emitted from a tracer within subject 16, collide with electrons inside a subject. When a photon collides with a scintillator on the detector array 400, the photon collision produces a scintilla on the scintillator. The scintillator produces an analog signal that is transmitted to an electronics section (not shown) that may form part of the detector array 500. The electronics section outputs an analog signal when a scintillation event occurs. A set of acquisition circuits 520 is provided to receive these analog signals. The acquisition circuits 520 process the analog signals to identify each valid event and provide a set of digital numbers or values indicative of the identified event. For example, this information indicates when the event took place and the position of the scintillation scintillator that detected the event.

The digital signals are transmitted through a communication link, for example, a cable, to a data acquisition controller 522. The data acquisition controller 522 performs scatter correction and/or various other operations based on the received signals. The PET system 12 may also include an image reconstruction processor 524 that is interconnected via a communication link 526 to the data acquisition controller 522. During operation, the image reconstruction processor 524 performs various image enhancing techniques on the digital signals and generates an image of the subject 16.

Figure 6:
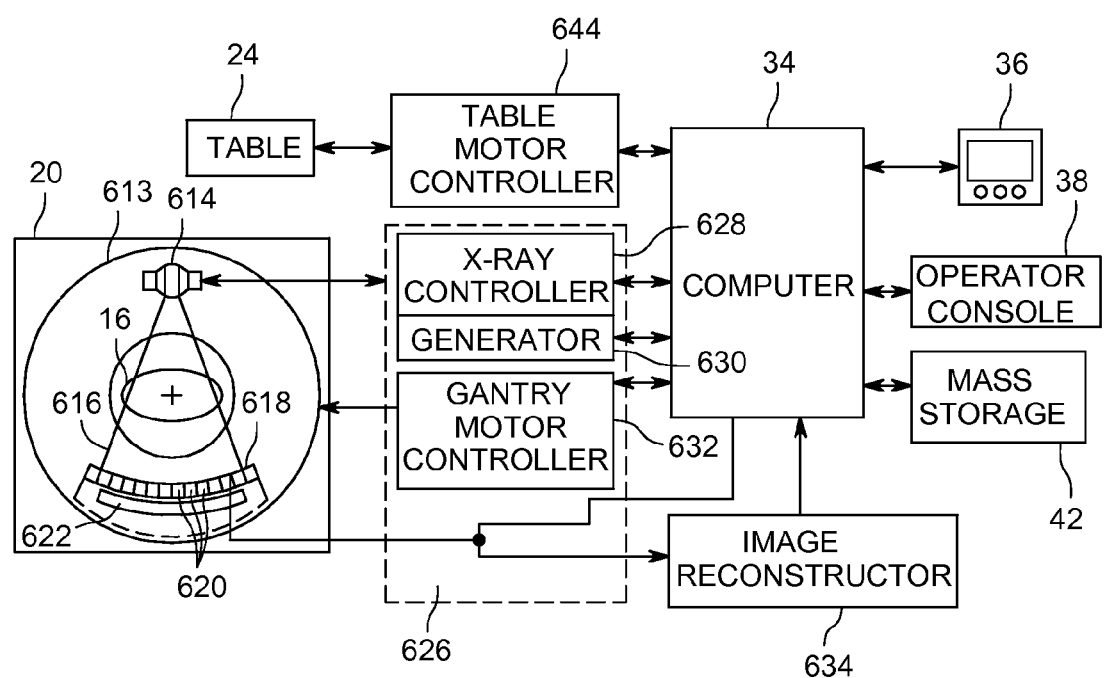
FIG. 6 is a block schematic diagram of a second modality unit shown in FIG. 1 in accordance with various embodiments.

FIG. 6 is a block schematic diagram of the second modality unit 14, e.g. the CT system, shown in FIG. 1. Gantry 20 has a rotary member 613 an x-ray source 614 that projects a beam of x-rays 616 toward a detector assembly 618 on the opposite side of the rotary member 613. A main bearing may be utilized to attach the rotary member 613 to the stationary structure of the gantry 20. X-ray source 614 includes either a stationary target or a rotating target. Detector assembly 618 is formed by a plurality of detectors 620 and data acquisition systems (DAS) 622. A collimator can be included at the detector end and/or at the x-ray emission end depending on the particular embodiment configuration. The plurality of detectors 620 sense the projected x-rays that pass through a subject 16, and DAS 622 converts the data to digital signals for subsequent processing. Each detector 620 produces an analog or digital electrical signal that represents the intensity of an impinging x-ray beam and hence the attenuated beam as it passes through subject 16. During a scan to acquire x-ray projection data, rotary member 613 and the components mounted thereon can rotate about a center of rotation.

Rotation of rotary member 613 and the operation of x-ray source 614 are governed by a control mechanism 626 of CT system. Control mechanism 626 can include an x-ray controller 628 and generator 630 that provides power and timing signals to x-ray source 614 and a gantry motor controller 632 that controls the rotational speed and position of rotary member 613. An image reconstructor 634 receives sampled and digitized x-ray data from DAS 622 and performs high speed image reconstruction. The reconstructed image is output to a computer 34 which stores the image in a computer storage device 42.

Computer 34 also receives commands and scanning parameters from an operator via operator input 38 that has some form of operator interface, such as a keyboard, mouse, touch sensitive controller, voice activated controller, or any other suitable input apparatus. Display 36 allows the operator to observe the reconstructed image and other data from computer 34. The operator supplied commands and parameters are used by computer 34 to provide control signals and information to DAS 622, x-ray controller 628, and gantry motor controller 632. In addition, computer 34 operates a table motor controller 644 which controls a motorized table 24 to position subject 16 and gantry 20.

The methods and systems described herein improve image quality, providing a quantitatively accurate activity concentration distribution image. The joint estimation methods and techniques can be applied without user action to auto-improve image quality. Further, a lower CT dose may be used since the joint estimation techniques could use a helical CT acquisition (static snapshot) to cover a 4D emission dataset, thus a full 4D CT may not be necessary and therefore dose received from the x-ray source would be reduced for a patient. In addition, joint estimation with quiescent period respiratory gating could improve the accuracy and reliability of the activity concentration images since there is no guarantee that the respiration state during helical CT data acquisition matches the quiescent portion of the emission respiration states. To accommodate a potential attenuation/emission mismatch, the same processes of joint activity/attenuation estimation near air/tissue borders can be used for this motion-reduced type of emission imaging, where only a percentage of each respiratory cycle, the most quiescent portion, is kept and used for activity concentration image reconstruction. If the attenuation information form the CT were not matched precisely, the attenuation values near air/tissue borders would be jointly-estimated with activity concentration values to allow for an amount of spatial mismatch and therefore improve the quantitative accuracy of the activity concentration images in these areas.

As used herein, a set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A imaging method, comprising:
   acquiring a computed tomography (CT) dataset;
   determining lung border information from the CT dataset;
   generating a border mask by generating an image mask for voxels within the lung border information and voxels within a parameterized distance of the lung border information;
   acquiring an emission tomography dataset; and
   reconstructing the emission tomography dataset;
   wherein the reconstructing the emission tomography dataset includes applying the border mask to the emission tomography dataset, reconstructing emission voxels inside the border mask with joint attenuation-activity estimation techniques, reconstructing emission voxels outside the border mask with activity estimation techniques, and combining reconstructed image voxels into a reconstructed emission tomography image.

2. The method of claim 1, wherein joint attenuation-activity estimation techniques comprise alternating updates of an image voxel between activity reconstruction and attenuation reconstruction.

3. The method of claim 2, wherein the joint attenuation-activity estimation techniques converge towards a local optimum.

4. The method of claim 2, wherein the activity reconstruction includes activity information from the emission tomography dataset and the attenuation reconstruction includes attenuation information from the CT dataset.

5. The method of claim 1, wherein activity estimation techniques comprise using an attenuation map generated from the CT dataset.

6. The method of claim 1, wherein the emission tomography dataset is a positron emission tomography (PET) dataset.

7. The method of claim 1, wherein the emission tomography dataset is a single photon emission computed tomography (SPECT) dataset.

8. The method of claim 1, further comprising:
   outputting the reconstructed emission tomography image to a network, display, printer, or memory device.

9. The method of claim 1, wherein the emission tomography dataset is four dimensional (4D) and the steps of determining lung border information, generating a border mask, and reconstructing the emission tomography dataset are performed for each bin of the emission tomography dataset.

10. The method of claim 9, further comprising:
    generating 4D reconstructed emission images by combining the reconstructed emission tomography datasets for each bin.

11. The method of claim 1, wherein the parameterized distance is set based on imaging history, a patient characteristic, or an operator input.

12. A medical imaging system, comprising:
a first modality imaging system;
an positron emission tomography (PET) system;
a computer coupled to the first modality system and the PET system, said computer being programmed to:
acquire a first modality dataset;
determine body border information from the first dataset;
generate a border mask by generating an image mask for voxels within the body border information and voxels within a parameterized distance of the body border information;
acquire a PET dataset; and
reconstruct the PET dataset;
wherein the reconstructing the PET dataset includes applying the border mask to the PET dataset, reconstructing PET voxels inside the border mask with joint attenuation-activity estimation techniques, reconstructing PET voxels outside the border mask with activity estimation techniques, and combining reconstructed PET image voxels into a reconstructed PET image.

13. The system of claim 12, wherein joint attenuation-activity estimation techniques comprise alternating updates of an image voxel between activity reconstruction and attenuation reconstruction.

14. The system of claim 13, wherein the joint attenuation-activity estimation techniques converge towards a local optimum.

15. The system of claim 13, wherein the activity reconstruction includes activity information from the PET dataset and the attenuation reconstruction includes attenuation information from the first modality dataset.

16. The system of claim 12, wherein activity estimation techniques comprise using an attenuation map generated from the first modality dataset.

17. The system of claim 12, further comprising:
outputting the reconstructed PET image to a network, display, printer, or memory device.

18. The system of claim 12, wherein the PET dataset is four dimensional (4D) and the steps of determining body border information, generating a border mask, and reconstructing the PET dataset are performed for each bin of the PET dataset.

19. The system of claim 18, further comprising:
generating 4D reconstructed PET images by combining the reconstructed PET datasets for each bin.

20. The system of claim 12, wherein the parameterized distance is set based on imaging history, a patient characteristic, or an operator input.

21. The system of claim 12, wherein the first modality is computed tomography (CT).

22. The system of claim 12, wherein the first modality is magnetic resonance imaging (MRI).

23. The system of claim 12, wherein body border information is lung border information.

24. The system of claim 23, wherein determining lung border information from the first modality dataset comprises determining an axial coverage range of the lung region from the first modality dataset and determining lung border information only in sections of the first modality dataset within the axial coverage range.

25. The system of claim 12, wherein body border information is respiratory-affected region information.

* * * * *